United States Patent [19]
Hadano

[11] Patent Number: 5,439,203
[45] Date of Patent: Aug. 8, 1995

[54] VIBRATION-DAMPING BUSHING WITH SLIDING SURFACE ON INSERT LOCATED BETWEEN INNER AND OUTER CYLINDERS

[75] Inventor: Katsuya Hadano, Inazawa, Japan

[73] Assignee: Toyoda Gosei Co., Ltd., Aichi, Japan

[21] Appl. No.: 966,462

[22] Filed: Oct. 26, 1992

[30] Foreign Application Priority Data

Oct. 24, 1991 [JP] Japan ................... 3-305367
Oct. 30, 1991 [JP] Japan ................... 3-311960

[51] Int. Cl.⁶ ............................... F16F 1/38
[52] U.S. Cl. ................... 267/140.12; 267/140.5; 248/609; 248/635; 384/203
[58] Field of Search ............... 267/140.11, 140.12, 267/140.13, 140.5, 140.3, 141.2, 141.3, 141.7, 136, 293, 153; 248/635, 609, 608; 384/192, 203, 206

[56] References Cited

U.S. PATENT DOCUMENTS

| | | | |
|---|---|---|---|
| 4,392,640 | 7/1983 | Kakimoto | 267/141.2 |
| 4,811,933 | 3/1989 | Inagaki et al. | 267/140.12 |
| 5,058,867 | 10/1991 | Hadano et al. | 267/141.7 X |
| 5,080,334 | 1/1992 | Mihara et al. | 267/153 X |

FOREIGN PATENT DOCUMENTS

3194230  8/1991  Japan ................... 248/635

*Primary Examiner*—Josie A. Ballato
*Attorney, Agent, or Firm*—Cushman, Darby & Cushman

[57] ABSTRACT

The vibration-damping bushing is provided having an outer cylinder and an inner cylinder which are coaxially arranged with each other. A ring-shaped insert which is made of a resin material having good slidability is inserted between the outer cylinder and the inner cylinder so that the inner peripheral surface of the insert is closely disposed to the outer peripheral surface of the inner cylinder. A pair of ring-shaped vibration-damping rubber members are press-fitted between the outer cylinder and the inner cylinder on both sides of the ring-shaped insert with metallic sleeves joined to the inner and outer peripheral surfaces of said ring-shaped vibration-damping rubber members, respectively. The inside axial end of the inner peripheral surface of each vibration-damping rubber member is spaced apart from each axial end surface of the insert by a predetermined distance. Upon input of the vibrations in the direction perpendicular to the axial direction, the inner cylinder comes into pressed contact with the insert, thereby sufficiently increasing the rigidity of the vibration damping bushing. Upon the input of the vibrations in the axial direction of the bushing, the inner cylinder freely slides relative to the insert, thereby decreasing the spring force of the vibration-damping bushing, and accordingly effecting good cushioning properties.

11 Claims, 5 Drawing Sheets

# VIBRATION-DAMPING BUSHING WITH SLIDING SURFACE ON INSERT LOCATED BETWEEN INNER AND OUTER CYLINDERS

BACKGROUND OF THE INVENTION

1. Field of the Invention

The present invention relates to a vibration-damping bushing, and more particularly to a vibration-damping bushing which is suitable to retain a suspension arm of a vehicle.

2. Description of Related Art

FIG. 9 illustrates a conventional vibration-damping bushing which includes an outer cylinder 10 secured to a frame of a vehicle, an inner cylinder 12 coaxially disposed within the outer cylinder 10, and a cylindrical vibration-damping rubber body 14 press-fitted between the outer cylinder 10 and the inner cylinder 12. One end of a suspension arm S of a vehicle is coaxially connected to the inner cylinder 12.

The vibration-damping rubber body 14 is required to be rigid in a direction perpendicular to an axial direction of the suspension arm S to effect good stability and controllability of the vehicle. In addition, the body 14 is also required to have sufficiently small spring characteristics in the axial direction of the suspension arm S for improving the cushioning properties of the vehicle.

However, with the above-described conventional vibration-damping bushing, if the spring constant of the vibration-damping rubber body 14 is increased in order to effect good stability and controllability, the cushioning properties will be decreased. Thus, conventionally, it has been impossible to realize good stability and controllability of the vehicle as well as good cushioning properties thereof.

SUMMARY OF THE INVENTION

An object of the present invention is to provide a vibration-damping bushing which enables improvement of the stability and controllability of a vehicle as well as improving the cushioning properties thereof.

The vibration-damping bushing, in accordance with the present invention, has an outer cylinder and an inner cylinder which are coaxially disposed with each other, and are respectively connected to a vibrating body, a ring-shaped insert which is inserted between the outer cylinder and the inner cylinder, and a pair of ring-shaped vibration-damping members, each being joined to the inner peripheral surface of the outer cylinder and the outer peripheral surface of the inner cylinder. The inside axial end of the inner peripheral surface of each vibration-damping rubber member is held in axially spaced relation apart from each of axial ends of the ring-shaped insert by a predetermined distance.

An inner peripheral surface and an outer peripheral surface of the insert are in contact with the outer peripheral surface of the inner cylinder and the inner peripheral surface of the outer cylinder, respectively, and at least one of the inner peripheral surface and the outer peripheral surface of the insert composes a sliding surface.

When vibrations are input to the vibration-damping bushing of the present invention in the direction perpendicular to the axial direction thereof, the inner cylinder comes into pressed contact with the insert, thereby stopping the displacement of the insert in this direction.

As a result, the rigidity of the vibration-damping bushing is sufficiently increased in this direction.

When vibrations are input to the vibration-damping bushing of the present invention in the axial direction thereof, the inner cylinder or the outer cylinder reciprocally slides relative to the insert by a distance within the predetermined distance. In this state, the spring force of the vibration-damping bushing depends only on each vibration-damping rubber member. Accordingly, by sufficiently decreasing the spring constant of each vibration-damping rubber member, good cushioning properties can be realized.

In addition, the inner cylinder can also displace in a torsional direction thereof. Cushioning properties can be also improved, due to the displacement of the inner cylinder.

Other objects, features and characteristics of the present invention will become apparent upon consideration of the following description and the appended claims with reference to the accompanying drawings, all of which from a part of this specification.

DETAILED DESCRIPTION OF THE PRESENTLY PREFERRED EXEMPLARY EMBODIMENTS

Figure 1:
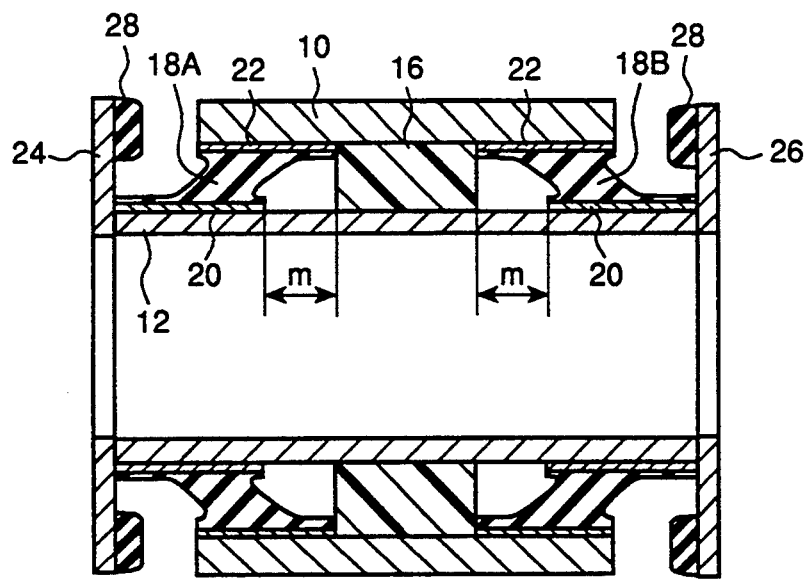
FIG. 1 is a longitudinal sectional view of a first embodiment of a vibration damping bushing provided in accordance with the present invention.

FIG. 1 illustrates a first embodiment of the present invention. As shown, an inner cylinder 12 is coaxially disposed within the outer cylinder 10. The inner cylinder 12 has a length slightly longer than that of the outer cylinder 10. A ring-shaped insert 16 is press-fitted between the outer cylinder 10 and the inner cylinder 12. The inner peripheral surface of the insert 16 is located close to the outer peripheral surface of the inner cylinder 12 with a uniform small clearance. The insert 16 is made of a synthetic resin material having good slidability, such as polyacetal.

Vibration-damping rubber members 18A, 18B are interposed between the outer cylinder 10 and the inner cylinder 12, respectively. Each of these vibration-damping rubber members 18A and 18B has an umbrella-shaped ring body. Metallic sleeves 20, 22 are joined to the inner peripheral surface and outer peripheral surface of each of the vibration-damping rubber members 18A, 18B, respectively, and these sleeves 20, 22 are press-fitted between the inner peripheral surface of the outer cylinder 10 and the outer peripheral surface of the inner cylinder 12. Each metallic sleeve 20 is spaced apart from each axial end surface of the insert 16 by a predetermined distance m.

Stopper plates 24, 26 are provided in contact with both axial end surfaces of the inner cylinder 12. Each of the stopper places 24, 26 has an opening of a diameter substantially equal to that of the inner cylinder 12. A stopper rubber layer 28 is circumferentially formed along an outer periphery of each of the stopper plates 24, 26 so as to be opposed to each axial end surface of the outer cylinder 10. One end of a suspension arm of a vehicle (not shown) is coaxially connected to the inner cylinder 12.

In operation, when vibrations are input from the suspension arm in the direction perpendicular to the axial direction thereof, the outer peripheral surface of the inner cylinder 12 comes into pressed contact with the inner peripheral surface of the insert 16 to prevent the displacement of the inner cylinder 12. As a result, the rigidity of the vibration-damping bushing is sufficiently increased in this direction, and accordingly, good stability and controllability of the vehicle can be realized in this direction.

When vibrations are input from the suspension arm in the axial direction thereof, the inner cylinder 12 freely slides relative to the insert 16 within the predetermined distance m. In this state, the spring constant of the vibration-damping bushing depends only on the deformation of the vibration damping rubber members 18A, 18B, and accordingly, by setting the spring constant of the rubber members 18A, 18B sufficiently small, the spring constant of the bushing can be decreased. As a result, good cushioning properties can be realized and a comfortable ride can be obtained. Moreover, the vibration-damping bushing of the present embodiment also ensures the torsional displacement of the inner cylinder 12 with respect to the outer cylinder 10. Due to this torsional displacement of the inner cylinder 12, the cushioning properties of the vehicle can be improved.

When excessively large vibrations are input in the axial direction of the bushing, each of the axial end surfaces of the outer cylinder 10 abuts on each of the stopper rubber layers 28 to prevent the excess deformation of the vibration-damping rubber members 18A, 18B, and accordingly prevents damage thereof.

With the first embodiment, the stopper rubber members 28 are provided on the stopper plates 24, 26.

Figure 2:
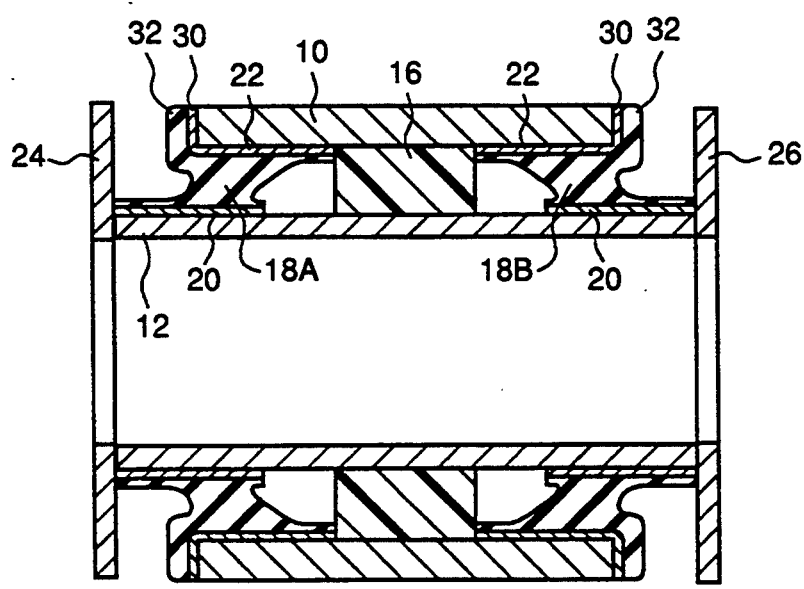
FIG. 2 is a longitudinal sectional view of a second embodiment of a vibration damping bushing provided in accordance with the present invention.

As an alternative, as in the second embodiment illustrated in FIG. 2, an axial end of each metallic sleeve 22 is extended and bent along each axial end surface of the outer cylinder 10 to compose a flange portion 30, and each of the vibration-damping rubber members 18A, 18B is extended along each flange portion 30 to compose a stopper portion 32. The remainder of the structure of the second embodiment is identical to that of the first embodiment.

With the second embodiment having the above-described construction, the stopper rubber members are not required to be formed on the stopper plates 24, 26. Accordingly, the production of the vibration-damping bushing can be facilitated more easily.

Figure 3:
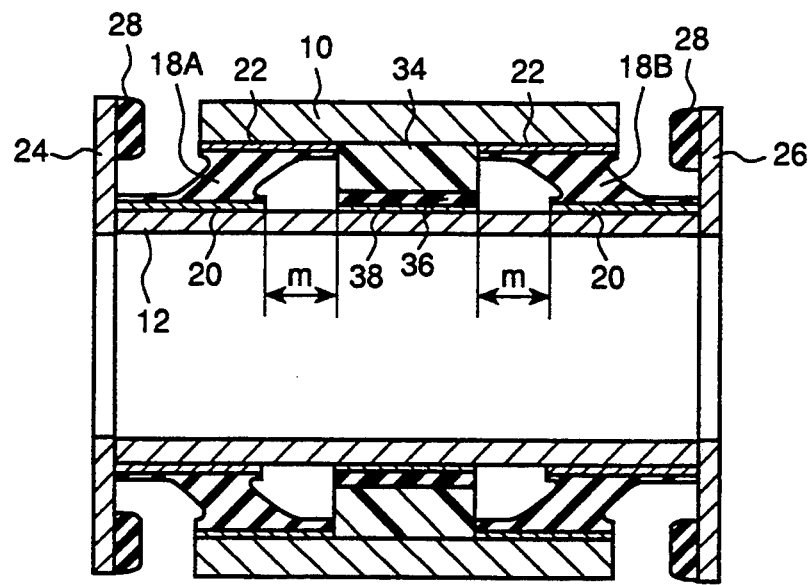
FIG. 3 is a longitudinal sectional view of a third embodiment of a vibration damping bushing provided in accordance with the present invention.

In the first and second embodiments, the insert 16 is made of a resin material having good slidability, such as polyacetal. In contrast, in the third embodiment illustrated in FIG. 3, an insert 34 is made of a resin or metal material. A rubber layer 36 of a uniform thickness is joined to the inner peripheral surface of the insert 34, and a sliding layer 38 having a small friction resistance is formed on the inner peripheral surface of the rubber layer 36.

The sliding layer 38 is formed by joining a liner composed of woven resin fibers having good slidability, such as "Teflon" to the inner peripheral surface of the rubber layer 36.

The internal diameter of the rubber layer 36 is made smaller than the external diameter of the inner cylinder 12 by a predetermined amount. The inner cylinder 12 is inserted into a rubber layer 36 while pushing the rubber layer 36 radially outward. As a result, the inner cylinder 12 comes into elastic contact with the sliding layer 38.

A double-structured liner composed of an inner layer of "Teflon" fibers and an outer layer of "Tetron" fibers may be used as the liner for the sliding layer 38.

The remainder of the structure of the third embodiment is identical to that of the first embodiment.

In operation, when vibrations are input from a suspension arm (not shown) in the direction perpendicular to the axial direction thereof, the outer peripheral surface of the inner cylinder 12 abuts the inner peripheral surface of the rubber layer 36 through the sliding layer 38, thereby preventing the displacement of the inner cylinder 10. Accordingly, if the thickness of the rubber layer 36 is made sufficiently thin, the rigidity of the vibration-damping bushing is maintained in this direction, and good stability and controllability of the vehicle are realized.

When vibrations are input from the suspension arm in the axial direction thereof, the inner cylinder 12 freely slides relative to the sliding layer 38 within the predetermined distance m, and accordingly, in this state, the spring constant of the vibration-damping bushing is sufficiently decreased because the spring constant thereof depends only on the deformation of the vibration-damping rubber members 18A, 18B. As a result, good cushioning properties are realized in this direction, and a comfortable ride is also achieved. The vibration damping bushing of the third embodiment also ensures the torsional displacement of the inner cylinder 12 with respect to the outer cylinder 10. Due to this torsional displacement, the cushioning properties can also be improved.

Furthermore, by virtue of the rubber layer 36, the sliding layer 38 comes into elastic contact with the outer peripheral surface of the inner cylinder 12, whereby noise or the like is prevented from being generated while the inner cylinder 12 slides relative to the insert 34. Due to the elasticity of the rubber layer 36, the cushioning properties are prevented from lowering in the direction perpendicular to the axial direction of the bushing.

Moreover, if excessively large vibrations are input in the axial direction of the bushing, the axial end surfaces of the outer cylinder 10 abut on the stopper rubber members 28, thereby preventing the vibration-damping rubber members 18A, 18B from being excessively deformed, and accordingly, preventing the damage thereof.

Figure 4:
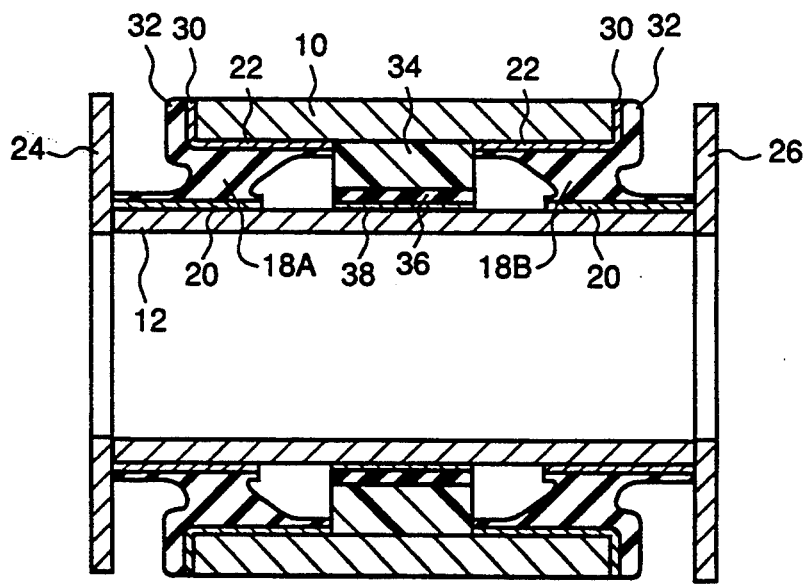
FIG. 4 is a longitudinal sectional view of a fourth embodiment of a vibration damping bushing provided in accordance with the present invention.

In the third embodiment, the stopper rubber members 28 are provided on the stopper plates 24, 26. Instead, with the fourth embodiment illustrated in FIG. 4, each metallic sleeve 22 is extended along each axial end surface of the outer cylinder 10 to define a flange portion 30, and each of the vibration-damping rubber members 18A, 18B is extended along and joined to each flange portion 30, thereby defining a stopper portion 32, as in the second embodiment. The remainder of the structure of the fourth embodiment is substantially identical to that of the third embodiment. In accordance with the fourth embodiment, the production of the vibration-damping bushing is greatly facilitated.

In the first through fourth embodiments, vibration-damping bushings which exhibit good rigidity in the direction perpendicular to the axial direction of the bushing, as well as exhibiting good cushioning properties in the axial direction thereof while ensuring the torsional displacement of the inner cylinder, are disclosed. In the following fifth through eighth embodiments, vibration-damping bushings exhibiting a characteristic so as to ensure the free twistable rocking of the inner cylinder in addition to the above-described characteristics are disclosed.

Figure 5:
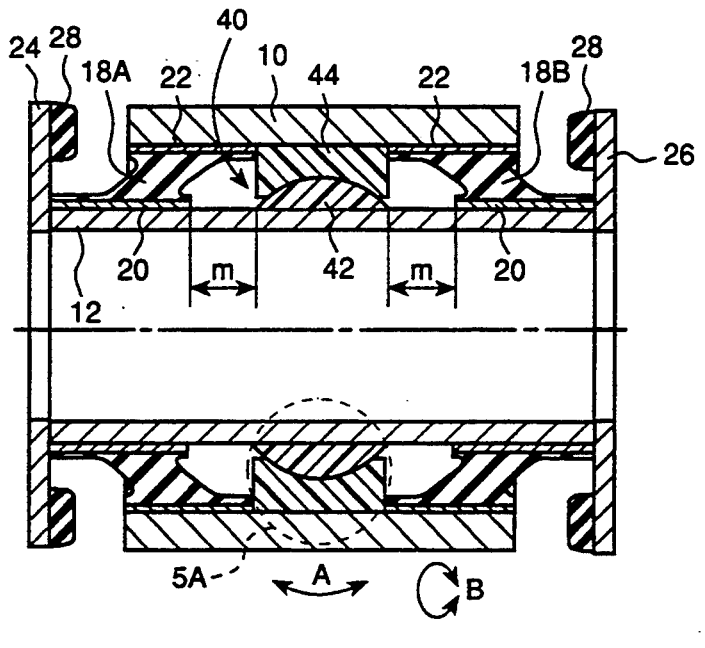
FIG. 5 is a longitudinal sectional view of a fifth embodiment of a vibration damping bushing provided in accordance with the present invention.
Figure 5A:
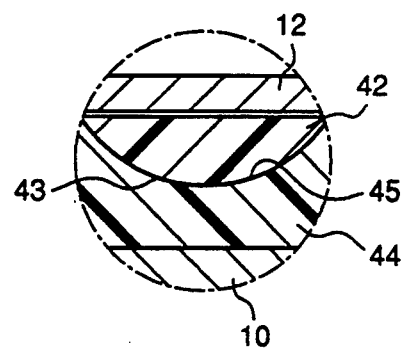
FIG. 5A is an enlarged view of the portion encircled in FIG. 5.

With the fifth embodiment illustrated in FIG. 5, the insert 40 includes a first insert 42 and a second insert 44. The first insert 42 is composed of a ring-shaped body of which an outer peripheral surface 43 has a spherical convex surface, and is made of a resin material having good slidability. The first insert 42 is coaxially disposed around the inner cylinder 12 so as to be close thereto with a small clearance. The second insert 44 is composed of a ring-shaped body of which an inner peripheral surface 43 has a spherical concave surface conforming to the outer peripheral surface of the insert 42, and is made of a resin material. The inner peripheral surface of the insert 44 faces the outer peripheral surface of the insert 42 through a small clearance while the outer peripheral surface of the insert 44 is joined to the inner peripheral surface of the outer cylinder 10.

The remainder of the structure of the fifth embodiment is identical to that of the first embodiment, illustrated in FIG. 1.

In operation, when vibrations are input in the direction perpendicular to the axial direction of the bushing, the inner cylinder 12 abuts the inner peripheral surface of the insert 44 through the insert 42, thereby sufficiently increasing the rigidity in this direction, and thus ensures good stability and controllability of the vehicle.

When vibrations are input in the axial direction of the bushing, the inner cylinder 12 slides freely relative to the inner peripheral surface of the insert 42. As a result, the spring constant of the vibration-damping bushing is sufficiently decreased, whereby good cushioning properties can be realized. In addition, the torsional displacement of the inner cylinder 12 is also ensured. Furthermore, the insert 42 slides with respect to the insert 44, thereby allowing a free twistable rocking in the direction shown by the arrows A in FIG. 5. Torsional displacement of the inner cylinder 12 is shown by arrows B in FIG. 5.

Figure 6:
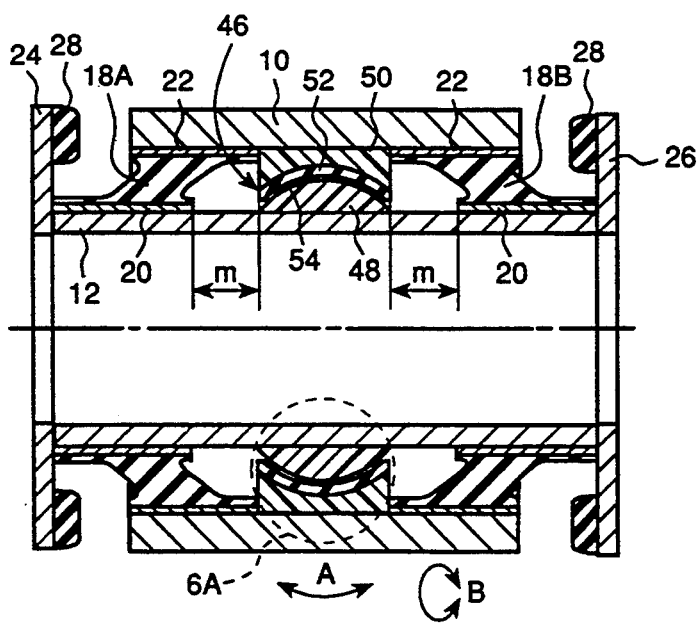
FIG. 6 is a longitudinal sectional view of a sixth embodiment of a vibration damping bushing provided in accordance with the present invention.
Figure 6A:
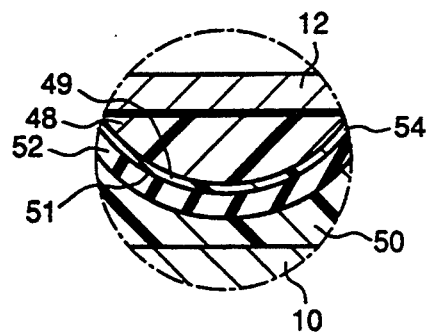
FIG. 6A is an enlarged view of the portion encircled in FIG. 6.

In the sixth embodiment illustrated in FIG. 6, the insert 46 includes a ring-shaped first insert 48 of which an outer peripheral surface 49 has a spherical convex surface, and a ring-shaped second insert 50, of which an inner peripheral surface 51 has a spherical concave surface conforming to the outer peripheral surface of the first insert 48, similarly to the fifth embodiment. The first insert 48 is made of a resin material having good slidability, and the second insert 50 is made of a resin material.

A rubber layer 52 having a uniform thickness is joined to the concave inner peripheral surface of the second insert 50. A sliding layer 54 having a low friction resistance is formed on the inner peripheral surface of the rubber layer 52. The rubber layer 52 and the sliding layer 54 of the sixth embodiment are made of materials which are respectively similar to those of the rubber layer 36 and the sliding layer 38 of the third embodiment. The internal diameter of the rubber layer 52 is made smaller than the external diameter of the first insert 48 by a predetermined amount, accordingly, the first insert 48 is in elastic contact with the sliding layer 54 while pushing the rubber layer 52 radially outward.

The remainder of the structure of the sixth embodiment is identical to that of the first embodiment illustrated in FIG. 1.

The sixth embodiment of the vibration damping bushing exhibits the same structural and functional advantages as the fifth embodiment. The first insert 48 slides relative to the sliding layer 54 to allow the first insert 48 to twistingly rock (arrows A) and torsionally displace (arrows B) relative to the second insert 50, and the vibration-damping properties of the bushing is improved by virtue of the rubber layer 52.

Figure 7:
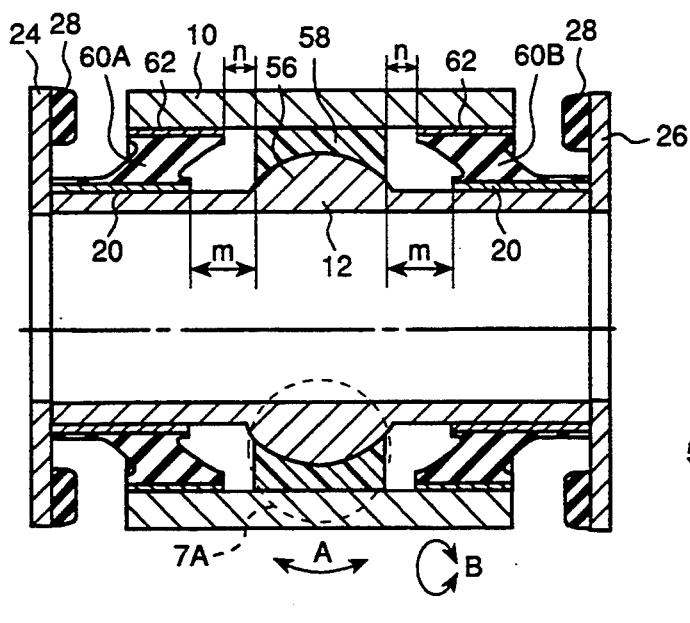
FIG. 7 is a longitudinal sectional view of a seventh embodiment of a vibration damping bushing provided in accordance with the present invention.
Figure 7A:
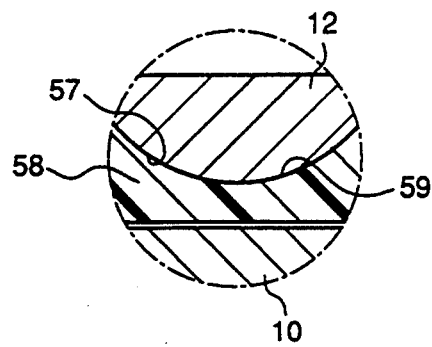
FIG. 7A is an enlarged view of the portion encircled in FIG. 7.

In the seventh embodiment illustrated in FIG. 7, the axially central portion of the inner cylinder 12 expands radially outward to form an expanded portion 56 of which the outer peripheral surface 57 is spherically convex. The insert 58 is made of a resin material having good slidability. The outer peripheral surface of the insert 58 has a configuration conforming to the inner peripheral surface of the outer cylinder 10 while the inner peripheral surface 59 thereof has a concave surface which conforms to the outer peripheral surface of the expanded portion 56 of the inner cylinder 12. They are located close to the inner peripheral surface of the outer cylinder 10 and the outer peripheral surface of the inner cylinder 12 with a small clearance, respectively.

Vibration-damping rubber members 60A, 60B are interposed between the outer cylinder 10 and the inner cylinder 12 in the vicinity of both axial ends thereof.

Metallic sleeves 20, 62 are respectively joined to the inner peripheral surface and outer peripheral surface of each of the vibration-damping rubber members 60A, 60B. These metallic sleeves 20, 62 are press-fitted between the outer cylinder 10 and the inner cylinder 12. Each metallic sleeve 20 is spaced apart from the insert 58 by a predetermined distance m whereas each metallic sleeve 62 is spaced apart from the insert 58 by a predetermined distance n. The remainder of the structure of the seventh embodiment is identical to that of the first embodiment illustrated in FIG. 1.

In operation, when vibrations are input in the direction perpendicular to the axial direction thereof, the expanded portion 56 of the inner cylinder 12 comes into pressed contact with the inner peripheral surface of the outer cylinder 10 through the insert 58, whereby the rigidity in this direction is sufficiently increased, and accordingly, good stability and controllability of the vehicle is realized.

When vibrations are input in the axial direction, the insert 58 slides freely relative to the outer cylinder 10 so as to be integral with the inner cylinder 12 within the distance n. As a result, the spring constant of the vibration-damping bushing can be sufficiently decreased, and accordingly, good cushioning properties in this direction can be realized. In addition, the displacement of the inner cylinder 12 in the torsional direction is also ensured (arrows B in FIG. 7).

Furthermore, with the seventh embodiment, the expanded portion 56 of the inner cylinder 12 slides relative to the spherical convex surface of the insert 58, thereby ensuring the inner cylinder 12 will freely twistingly rock, as shown by the arrows A in FIG. 7.

Figure 8:
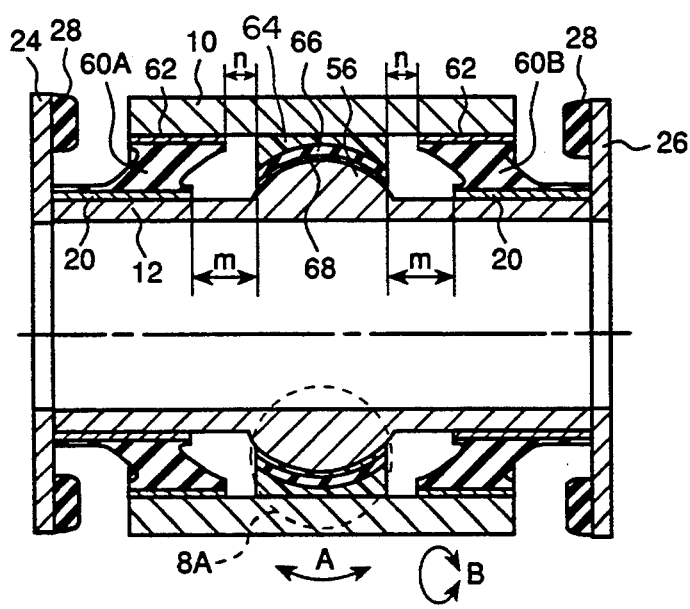
FIG. 8 is a longitudinal sectional view of an eighth embodiment of the vibration damping bushing provided in accordance with the present invention.
Figure 8A:
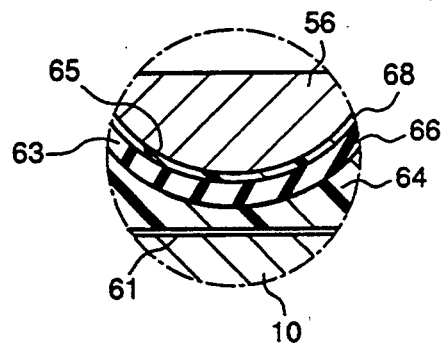
FIG. 8A is an enlarged view of the portion encircled in FIG. 8.
Figure 9:
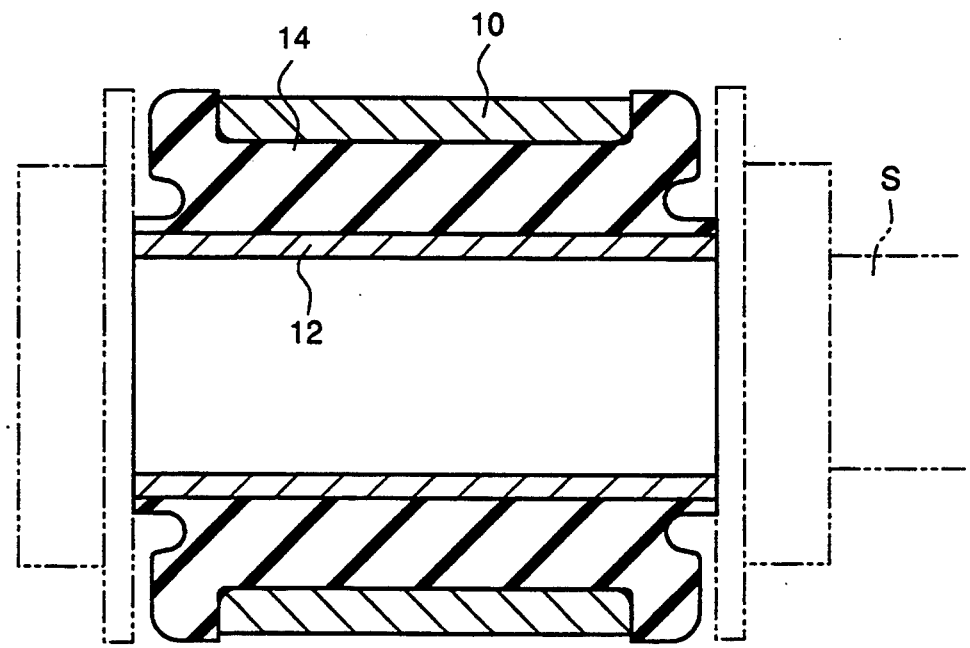
FIG. 9 is a longitudinal sectional view of one example of a conventional vibration damping bushing.

In the eighth embodiment illustrated in FIG. 8, the expanded portion 56 having a spherically convex outer surface is formed around the inner cylinder 10 as in seventh embodiment. Insert 64 is made of a resin material having good slidability. The outer peripheral surface 61 thereof has a configuration conforming to the inner peripheral surface of the outer cylinder 10 whereas the inner peripheral surface 63 thereof is spherically concave so as to conform to the outer peripheral surface 65 of the expanded portion 56 of the inner cylinder 12.

A rubber layer 66 of a uniform thickness is joined to the concave inner peripheral surface of the insert 64. A sliding layer 68 having a low frictional resistance is formed on the inner peripheral surface of the rubber layer 66. The rubber layer 66 and the sliding layer 68 are made of materials which are identical to those of the rubber layer 36 and the sliding layer 38 of the third embodiment, respectively. The internal diameter of the rubber layer 66 is made smaller than the external diameter of the expanded portion 56 of the inner cylinder 12 by a predetermined amount. The expanded portion 56 is in elastic contact with the sliding layer 66 while pushing the rubber layer 66 radially outward.

The remainder of the structure of the eighth embodiment is identical to that of the seventh embodiment illustrated in FIG. 7.

The bushing of the eighth embodiment having the above-described construction can achieve substantially the same structural and functional advantages as those of the seventh embodiment. The insert 64 can twistably rock (arrows A) and torsionally displace (arrows B) relative to the inner cylinder 56. In addition, the vibration damping properties can be improved by virtue of the rubber layer 66.

In the fifth through eighth embodiments, the stopper rubber members 28 are formed on the stopper plates 24, 28 provided around both ends of the inner cylinder 12. Instead, the stopper rubber members may be provided by extending one portion of each vibration damping rubber member along each end surfaces of the outer cylinder as in the second and fourth embodiments.

As described above, with the present invention, vibration-damping bushings are provided so as to exhibit both large rigidity in the direction perpendicular to the axial direction thereof, and sufficiently small spring characteristics in the axial direction. Therefore, excellent stability and controllability as well as good cushioning properties can be realized.

While the invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A vibration-damping bushing comprising:
   an outer cylinder;
   an inner cylinder coaxially arranged with said outer cylinder, said inner and outer cylinders being adapted to be connected to a vibrating body;
   ring-shaped insert structure made of resin material and disposed between said outer cylinder and said inner cylinder, both an inner peripheral surface and an outer peripheral surface of said ring-shaped insert structure being in direct contact with an outer peripheral surface of said inner cylinder and an inner peripheral surface of said outer cylinder respectively only when vibrations are input with a component perpendicular with respect to an axial direction of the cylinders, at least one of said inner peripheral surface and said outer peripheral surface of said ring-shaped insert structure being in close proximity to at least one of said outer peripheral surface of said inner cylinder and said inner peripheral surface of said outer cylinder so as to define a clearance therebetween, thereby forming a sliding surface; and
   a pair of ring-shaped vibration-damping rubber members which are interposed between and joined to said inner peripheral surface of said outer cylinder and said outer peripheral surface of said inner cylinder so that an inside axial end of an inner peripheral surface of each of said rubber members is axially spaced apart from each of axial ends of said ring-shaped insert structure by a predetermined distance, whereby one of said outer and inner cylinders is constructed and arranged to be displaced in an axial direction and a torsional direction thereof so as to improve cushioning properties of the bushing.

2. The vibration-damping bushing according to claim 1, wherein said resin material has a low frictional resistance.

3. The vibration-damping bushing according to claim 1, wherein said sliding surface of said ring-shaped insert structure is composed of a sliding layer having a low frictional resistance, said sliding layer being disposed over a rubber layer and formed on at least one of said outer peripheral surface and said inner peripheral surface of said ring-shaped insert structure, whereby said at least one of said outer peripheral surface and said inner peripheral surface of said ring-shaped insert structure is in contact with one of said outer peripheral surface of said inner cylinder and said inner peripheral surface of said outer cylinder through said rubber layer and said sliding layer.

4. The vibration-damping bushing according to claim 1, wherein one of said outer peripheral surface and said inner peripheral surface of said ring-shaped insert structure is secured to one of said inner peripheral surface of said outer cylinder and said outer peripheral surface of said inner cylinder.

5. The vibration-damping bushing according to claim 1, wherein said outer peripheral surface and said inner peripheral surface of said insert structure include sliding surfaces with respect to said inner peripheral surface of said outer cylinder and said outer peripheral surface of said inner cylinder, respectively.

6. The vibration-damping bushing according to claim 5, wherein said inner cylinder includes a spherical convex outer surface at an axially central portion thereof, said insert structure including a spherical concave inner surface which conforms to said spherical convex outer surface of said inner cylinder, said spherical concave inner surface of said insert structure includes a sliding surface relative to said spherical concave outer surface of said inner cylinder thereby enabling a free twistable rocking of said inner cylinder, said outer peripheral surface of said insert structure includes a sliding surface relative to said inner peripheral surface of said outer cylinder thereby enabling axial sliding of said inner cylinder.

7. The vibration-damping bushing according to claim 1, further comprising:
stopper plates coaxially disposed at both ends of said inner cylinder, respectively, for preventing said pair of ring-shaped vibration-damping rubber members from being excessively deformed; and
stopper rubber members disposed between both end surfaces of said outer cylinder and said stopper plates, respectively.

8. The vibration-damping bushing according to claim 1, wherein said ring-shaped insert structure includes a ring-shaped first insert having a spherical convex outer peripheral surface, and a ring-shaped second insert having a spherical concave inner peripheral surface which conforms to said spherical convex outer peripheral surface of said first insert, and said spherical convex outer peripheral surface of said first insert slides relative to said spherical concave inner peripheral surface of said second insert, said bushing being constructed and arranged for free twistable rocking of one of said outer cylinder and said inner cylinder.

9. The vibration-damping bushing according to claim 8, wherein said first insert is made of resin material having a low frictional resistance, and said second insert is made of a resin material.

10. The vibration-damping bushing according to claim 9, wherein said spherical concave inner peripheral surface of said second insert has a sliding layer having a low frictional resistance, said sliding layer being disposed over a rubber layer and formed on said spherical concave inner peripheral surface of said second insert.

11. A vibration-damping bushing comprising:
an outer cylinder;
an inner cylinder coaxially arranged with said outer cylinder, said inner and outer cylinders being adapted to be connected to a vibrating body;
ring-shaped insert structure made of a resin material and disposed between said outer cylinder and said inner cylinder, both an inner peripheral surface and an outer peripheral surface of said ring-shaped insert structure being in direct contact with an outer peripheral surface of said inner cylinder and an inner peripheral surface of said outer cylinder respectively only when vibrations are input with a perpendicular component with respect to the axial direction of the cylinders, said ring-shaped insert structure including a sliding surface; and
a pair of ring-shaped vibration-damping rubber members which are interposed between and joined to said inner peripheral surface of said outer cylinder and said outer peripheral surface of said inner cylinder so that an inside axial end of an inner peripheral surface of each of said rubber members is axially spaced apart from each of axial ends of said ring-shaped insert structure by a predetermined distance.

* * * * *